UNITED STATES PATENT OFFICE.

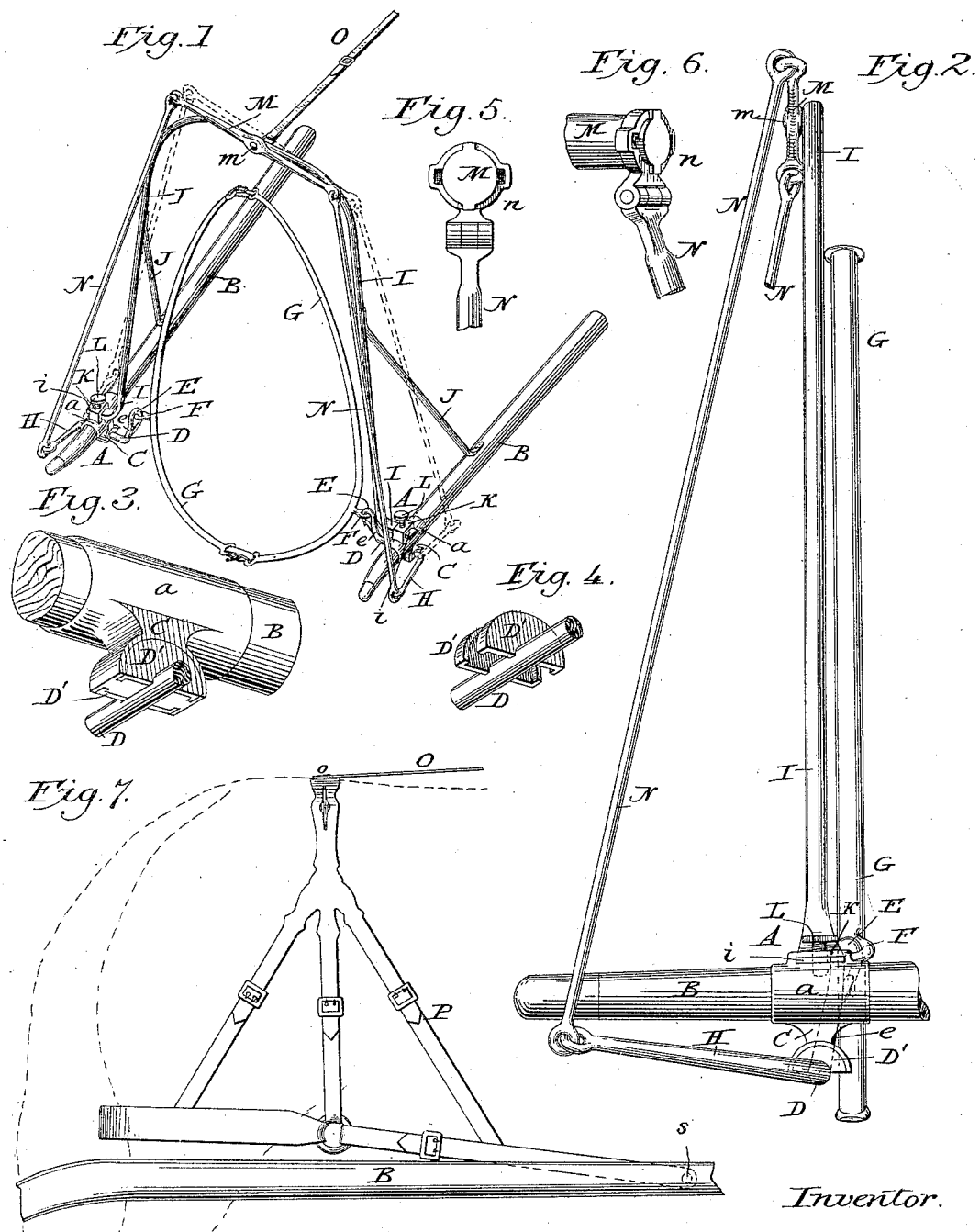

BYRON B. BOWER, OF BAINBRIDGE, GEORGIA.

HARNESS.

SPECIFICATION forming part of Letters Patent No. 448,292, dated March 17, 1891.

Application filed June 14, 1890. Serial No. 355,513. (No model.)

*To all whom it may concern:*

Be it known that I, BYRON B. BOWER, a citizen of the United States, residing at Bainbridge, in the county of Decatur and State of Georgia, have invented certain new and useful Improvements in Harness, of which the following is a specification.

The object of my invention is to provide improved harness to readily attach a horse to a vehicle.

I dispense with the ordinary whiffletree of single harness, the traces, the trace-jogs, the saddle, belly-band, and shaft-band, the thill-jogs, and also the back strap and crupper.

My improvements may be used in connection with the bridle, lines, breast-collar, hames, or breast-strap without hames, breeching, and holdback-straps of ordinary harness.

My improvements are shown in the accompanying drawings and hereinafter described and claimed.

As will appear from the description and the illustration, the horse may be quickly hitched and unhitched, and the motion of the horse's shoulders in both the forward-and-backward and up-and-down movements is accommodated so as to relieve the animal from undue strain.

In the accompanying drawings, Figure 1 is a perspective view showing my improvements applied to the front of a pair of shafts; Fig. 2, a side elevation of the same on an enlarged scale. Fig. 3 is a detail view in perspective, showing one of the couplings. Fig. 4 is a similar view, some parts of the coupling being detached. Figs. 5 and 6 show couplings which may be used to connect certain parts of the harness; and Fig. 7 is a side elevation of the holdback part of the harness, which remains permanently attached to the shafts.

On the front ends of the shafts B are secured couplings A, consisting of sleeves $a$, through which the shafts extend, downwardly-projecting arms C, having bearings for the axles D of the hooks E, and loops or sockets K for the yoke I. The axle D is provided with coupling-pieces D', having inwardly-projecting flanges which interlock with corresponding parts in the bracket C. The yoke I is arch-shaped, and its laterally-projecting lower portions or feet $i$ are adjustably secured by set-screws L in the sockets K. Inclined braces J are connected to the yoke on each side, preferably about midway between the top and bottom thereof, and also to the shafts in rear of the yoke.

A bar M is pivoted centrally at $m$ to the top of the yoke I and at its opposite ends is flexibly connected with downwardly-projecting rods N, which at their lower ends are flexibly connected with the arms H of the hooks E, which connect the shafts to the hames G. Two such hooks are employed, one on each shaft, and these hooks are preferably arranged, as shown, to enter the rings F on the hames from the front, and may be slightly springy or flexible at the hook end, so that the horse will not be held too rigidly between them. The shanks $e$ of the hooks normally occupy a vertical position at right angles to the shafts and are always at right angles to the axles D, which have their bearings in the brackets C. The arms H extend forwardly at right angles from the axles D and at right angles to the hooks, and are connected to the lower ends of the rods N, as above mentioned.

Instead of double-ring connections between the bar M and the rods N, as shown in Fig. 1, I may employ a hinge-connection $n$ of well-known construction, such as shown in Figs. 4 and 5. I may also provide the hooks with backwardly-extending arms and two rods on each side, as shown by dotted lines, and the two cross-bars at the top of yoke I.

This holdback part of harness is of well-known construction, except that I preferably employ an additional strap P, or instead of the strap P, I may use a strap O, attached to the top of the yoke I, extending along the back of the horse and secured to the top of the holdback-harness at $o$. The rear harness is preferably permanently secured at $s$ to the shafts on each side. The hooks E are preferably spring-hooks, so as to be readily secured to the hame-rings F and securely united therewith. For drays or vehicles of heavy draft this yoke and other apparatus can be located on the shafts opposite the saddle and connected with the hames by short traces or chains.

The coupling shown in Figs. 3 and 4, having flanges on part D, Fig. 4, which fit in grooves in part C of Fig. 3, can be interlocked into each other by placing the two together in a reverse position and then turning them a half-circle to their proper working position, and can be taken apart for oiling, &c., the same way.

A horse may be readily hitched to a vehicle with my improved harness by simply lifting the shafts, adjusting the rear harness, lowering the yoke I, and engaging the hooks E with the rings F of the hames, and may be unhitched by a reversal of these operations.

When in use, the horse in stepping forward on one side moves the hook E on its axle in one direction, and by reason of the pivoted bar M and the rods N the hook on the opposite side is moved in a reverse direction. This flexible connection between the shafts and the hames on opposite sides makes the harness easy and comfortable.

I claim as of my own invention—

1. The combination, substantially as hereinbefore set forth, of the yoke, the cross-piece pivoted thereon, the downwardly-projecting rods, and the hook-arms to which they are flexibly secured.

2. The combination, substantially as hereinbefore set forth, of the yoke, the shafts to which it is secured, the braces extending backwardly from the yoke and secured to the shafts, the bar pivoted to the top of the yoke, the hooks adapted to be secured to the hames, and connections between the hooks and the pivoted bar.

3. The combination, substantially as hereinbefore set forth, of the yoke having laterally-projecting feet adjustably secured to the shafts, the bar pivoted to the top of the yoke, the hooks, and connections between the hooks and the pivoted bar.

4. The combination, substantially as hereinbefore set forth, of the shafts, the yoke secured thereto, the hooks having arms extending at right angles to their shanks, the bar pivoted to the top of the yoke, and the rods connecting the hook-arms to the pivoted bar.

5. The combination, substantially as hereinbefore set forth, of the shafts, the couplings A, having loops and downwardly-projecting bearing-brackets C, and loops K, the yoke having laterally-projecting feet adjustably secured in the loops K, the bar pivoted to the top of the yoke, the hooks journaled in the brackets C, and the rods connecting the hooks with the pivoted bar.

6. The combination, substantially as hereinbefore set forth, of the shafts, the rear harness permanently secured thereto, the yoke secured to the front end of the shafts, the pivoted bar at the top of the yoke, the hooks adapted to engage with the hames, the rods connecting the hooks with the pivoted bar, and the strap O, extending from the top of the yoke to the rear harness.

7. The combination, substantially as hereinbefore set forth, of the shafts, the rear harness permanently secured thereto, the yoke secured to the front end of the shafts, the pivoted bar at the top of the yoke, the hooks adapted to engage with the hames, the rods connecting the hooks with the pivoted bar, and the strap P in the rear harness.

8. The combination, substantially as hereinbefore set forth, of the hook having the axle D, formed with coupling-pieces D', with inwardly-projecting flanges, and the bracket C, with which the pieces D' interlock.

In testimony whereof I have hereunto subscribed my name.

BYRON B. BOWER.

Witnesses:
R. B. KERR,
C. W. WIMBERLEY.